(12) United States Patent
Tange et al.

(10) Patent No.: US 6,544,360 B1
(45) Date of Patent: Apr. 8, 2003

(54) HIGHLY STRENGTHENED SPRING AND PROCESS FOR PRODUCING THE SAME

(75) Inventors: Akira Tange, Yokohama (JP); Kotoji Ando, Fujisawa (JP); Koji Watanabe, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/980,127

(22) PCT Filed: Jun. 8, 2000

(86) PCT No.: PCT/JP00/03730

§ 371 (c)(1),
(2), (4) Date: Jan. 11, 2002

(87) PCT Pub. No.: WO00/75381

PCT Pub. Date: Dec. 14, 2000

(65) Prior Publication Data (65)

(30) Foreign Application Priority Data

Jun. 8, 1999 (JP) ............................................. 11-160706

(51) Int. Cl.⁷ ................................................. C21D 7/06
(52) U.S. Cl. ............................ 148/580; 148/908; 75/53; 29/90.7
(58) Field of Search .................................. 148/908, 580; 75/53; 29/90.7

(56) References Cited

U.S. PATENT DOCUMENTS

| 5,258,082 A | 11/1993 | Koyama et al. |
| 5,816,088 A | 10/1998 | Yamada et al. |
| 6,022,427 A | 2/2000 | Wienand et al. |

FOREIGN PATENT DOCUMENTS

| EP | 694621 | 1/1996 |
| JP | 5-31671 | 2/1993 |
| JP | 5-140643 | 6/1993 |
| JP | 5-148537 | 6/1993 |
| JP | 5-177544 | 7/1993 |
| JP | 5-179349 | 7/1993 |
| JP | 8-41533 | 2/1996 |
| JP | 9-279229 | 10/1997 |
| JP | 11-114827 | 4/1999 |

*Primary Examiner*—Deborah Yee
(74) *Attorney, Agent, or Firm*—Arent Fox Kintner Plotkin & Kahn, PLLC

(57) ABSTRACT

In a production process for highly strengthened springs, the process comprises performing a first shot peening to a spring steel having a hardness of a diameter of 2.7 mm or less on a Brinell ball mark while applying stress to the springs at a warm temperature in the range of 150 to 350° C.

8 Claims, 4 Drawing Sheets

HIGHLY STRENGTHENED SPRING AND PROCESS FOR PRODUCING THE SAME

TECHNICAL FIELD

The present invention relates to a highly strengthened spring suitable for suspension springs and valve springs for automobiles and in other industries, and relates to a production process for the same, and particularly relates to technologies to greatly improve the durability thereof.

BACKGROUND ART

Heretofore, in automotive springs typified by suspension springs, the service stress (design stress) has been higher to save energy, and these springs are required to have superior cold creep properties (sag resistance) and high durability. Springs are normally produced in such a way that spring steels are subjected to heat treatments of quenching and tempering after forming. In recent years, a tendency has been seen in which the tempering temperature is lowered to increase the hardness of the springs and to improve cold creep properties. It is known that durability is generally improved by increasing the hardness of the springs by such a method.

However, since the notch sensitivity increases as the hardness of the material increases, the scattering of the durability increases and the reliability of the springs is decreased. When the material is hard, shot used for shot peening processes yields to the hard material. This means that the working by a shot peening process is difficult and a compressive residual stress layer, which is most effective for improving the fatigue strength, cannot be sufficiently imparted, and this therefore results in an important problem in that the fatigue strength cannot be improved. In order to facilitate the performance of the shot peening process, increasing the hardness of the shot may be contemplated. In this case, the shot readily breaks and production cost is relatively high. In such circumstances, much research in shot peening technology for improving durability has been made.

As a shot peening technology to further improve durability, warm shot peening performed at a warm temperature range has been known, as is proposed in Japanese Patent No. 725630. As proposed in U.S. Pat. Nos. 959,801 and 3,094,768, and Japanese Patent Application, First Publication, No. 148537/93, stress shot peening performed while applying stress to spring steels has been known. Moreover, double shot peening is known in which spring steels are subjected to a shot peening process and are then subjected to a shot peening process using smaller shot than in the first process. One-time shot peening cannot increase the compressive residual stress in the outermost surface portion of the spring steel. The double shot peening can increase the compressive residual stress in that portion by causing a plastic deformation there at using a small shot.

However, even these various types of shot peening technology are not sufficient to cope with the recent increased service stress due to the weight-reduction in springs. It is therefore an object of the invention to provide a highly strengthened spring and a production process for the same, which can greatly improve durability in high service stress.

DISCLOSURE OF THE INVENTION

The applicant or assignee previously proposed a warm shot peening method in Japanese Patent Application, First Publication, No. 140643/93 in which the hardness of the spring steel and the temperature in the warm shot peening are limited. The inventors have researched combining the warm shot peening method with the stress shot peening, and they have discovered that the durability of spring steels is greatly improved thereby.

The process for producing highly strengthened springs of the present invention has been made based on the above knowledge. The present invention provides a highly strengthened spring producing process comprising performing a first shot peening on a spring steel having a Vickers hardness (hereinafter referred to as "HV) of 550 or more (corresponding to a diameter of 2.7 mm or less on a Brinell ball mark, which is hereinafter referred to as "HBD") in applying stress to the spring at a warm temperature in the range of 150 to 350° C. The effects and advantages of the invention will be explained hereinafter together with the reasons for the above numerical limitations.

Hardness of Spring Steel: BHD 2.7 mm or More

FIG. 1 shows the relationship between the hardness of the coil spring and the number of cycles to failure when a fatigue test was performed on two types of coil springs which were subjected to shot peening at a warm temperature or at room temperature. In the warm shot peening, the coil spring was heated to 300° C. for 20 minutes and was immediately subjected to shot peening. As will be understood from FIG. 1, in the coil spring subjected to the warm shot peening, the durability is improved as the hardness of the coil spring increases, and remarkable improvement of the durability can be obtained when the hardness is 550 HV (HBD 2.7 mm) or more.

Thus, the effects of improvement in durability due to the warm shot peening is sufficiently demonstrated when the hardness of the spring steel is 550 HV or more (HBD 2.7 mm or more). Therefore, the hardness of the spring steel is set at 550 HV or more (HBD 2.7 mm or more). Since the durability is greatly improved when the hardness of the spring steel is 600 HV or more (HBD 2.6 mm or more), the hardness of the spring steel is preferably 600 HV or more. It should be noted that HBD is the diameter of a recess formed by impacting a cemented carbide ball with a diameter of 10 mm against a surface of a sample at a load of 300 kgf.

Temperatures for Warm Stress Shot Peening: 150 to 350° C.

FIG. 2 shows the relationship between the temperature of coil springs in shot peening and the number of cycles to failure. As will be understood from FIG. 2, the durability is superior in the overall temperature range of 200 to 350° C. in the shot peening than in the case in which the shot peening was performed in room temperature. It can be assumed that the same effect as the above can be obtained at 150° C., which is relatively lower than 200° C., and the temperature range in the warm shot peening is set in the range of 150 to 350° C. The temperature in the warm shot peening is preferably in the range of 250 to 325° C. since the durability is most improved in this temperature range. It should be noted that the durability is relatively decreased when the temperature in the shot peening is 350° C. The reason of this is that the degree of working by the shot peening is large and the surface roughness is large at 350° C. as also shown in FIG. 2, and the notch sensitivity is therefore increased. Furthermore, the relief of the compressive residual stress is promoted at 350° C., and this also causes decrease in durability.

The present invention is characterized in performing a first shot peening on a spring while applying stress to the spring at a warm temperature in the range of 150 to 350° C. In a conventional stress shot peening while applying stress to the spring at room temperature, it was believed that the stress promotes plastic flow caused by shot, and large compressive residual stress could be generated deeply. However, in the highly strengthened springs according to the invention, the hardness of the springs is equivalent or greater than that of shot. Therefore, sufficient plastic flow cannot be obtained by shot peening by only imparting stress, and sufficient improvement in the fatigue strength cannot be obtained. Therefore, shot peening is performed while applying stress at a warm temperature in the invention. As a result, the inventors have discovered that astonishing improvement in durability can be obtained compared to in warm stress shot peening or shot peening at room temperature.

That is, the highly strengthened spring of the present invention is obtained by performing a first shot peening on a spring steel having a 550 HV or more (corresponding to a diameter of 2.7 mm or less on a Brinell ball mark) while applying stress to the spring at a warm temperature in the range of 150 to 350° C., whereby large compressive residual stress is deeply imparted. Therefore, the durability of the spring during use is greatly improved. The preferred embodiments of the invention will be explained hereinafter.

BEST MODE FOR CARRYING OUT THE INVENTION

Stress Conditions for Warm Stress Shot Peening

The stress imparted to the coil spring in the warm stress shot peening is preferably 75 kgf/mm² or more. By performing the warm stress shot peening under such stress, the durability of the coil spring is greatly and reliably improved.

Figure 6:
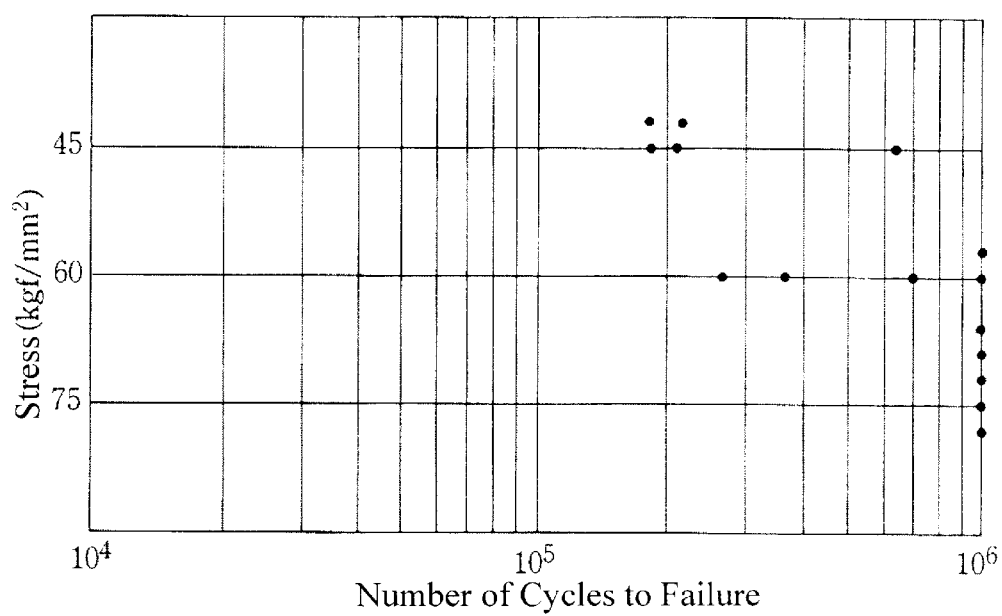
FIG. 6 is a diagram showing the relationship between the number of cycles to failure and the stress in a warm stress shot peening in a second example.

That is, the stress applied to a coil spring was set at 45, 55, or 75 kgf/mm², and the coil spring was subjected to stress shot peening, and was then subjected to a durability test with a stress condition of 65±45 kgf/mm². The result of the test is shown in FIG. 6. In FIG. 6, the plots with the same number of cycles are separated vertically. As is shown in FIG. 6, all coil springs were not broken at a million cycles when the stress was 75 kgf/mm², and the coil springs were broken at cycles ranging from 100,000 to 600,000 when the stress was 60 kgf/mm² or less. From these results, it is demonstrated that the stress applied to coil springs in warm stress shot peening is preferably 75 kgf/mm² or more.

Warm Stress Double Shot Peening

Warm stress double shot peening can be applied in the invention. In particular, after the first warm stress shot peening, a second shot peening is further performed on the spring steel using shot with a smaller diameter than that of the first shot peening in applying stress to the spring at a warm temperature in the range of 150 to 350° C. By this processing, plastic working can be imparted to the outermost surface of a spring steel, thereby increasing the compressive residual stress of that portion and further improving durability.

Preliminary Warm Shot Peening

In the case in which a coil spring is subjected to stress shot peening, both end surfaces of the coil spring are naturally held and compressed by a jig. Therefore, the end surface of the coil spring is covered by the jig, so that the effects of the stress shot peening are not imparted to the end surface. According to the inventors' research, it has been demonstrated that large stress is applied at the portion which rises from the end surface of the coil spring, and the portion is readily corroded since rain water and the like enters between the end surface and a supporting member thereof during use.

Therefore, shot peening on the end surface of coil springs is very important to improve durability. Therefore, at least the portion with which a jig contact to apply stress to the spring steel is preferably subjected to preliminary warm shot peening at a temperature in the range of 150 to 350° C. In particular, a pair of ablator wheels which rotate in mutually different directions is serially arranged above a production line, and shot peening is performed while traveling coil springs in the axial direction thereof along the production line.

Figure 1:
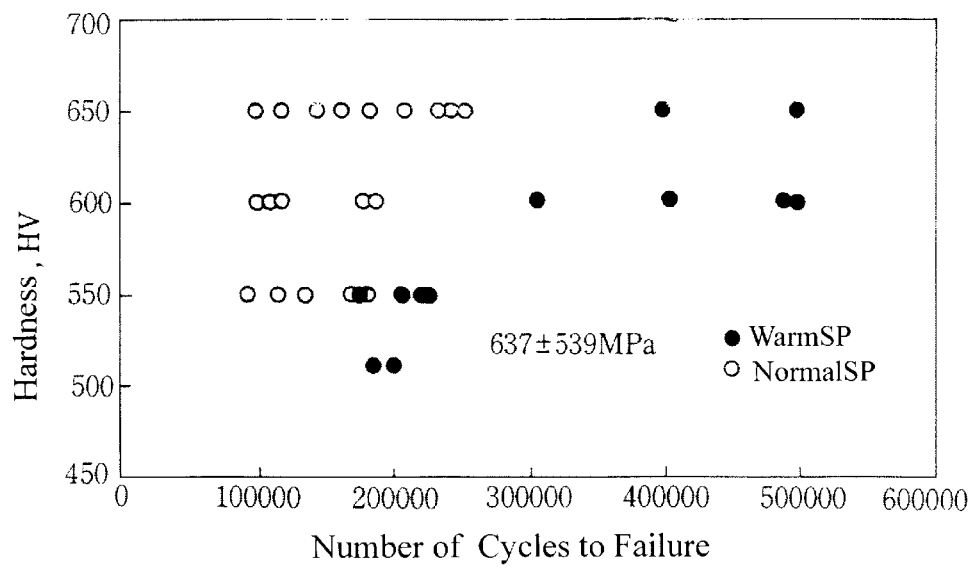
FIG. 1 is a diagram showing the relationship between the number of cycles to failure and the hardness of the spring steel in the invention.
Figure 2:
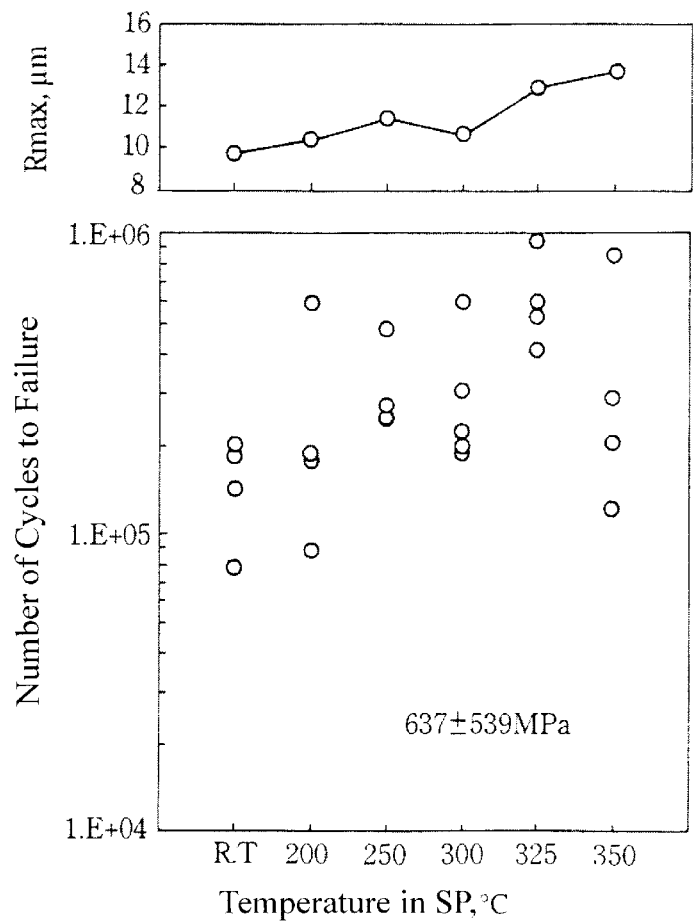
FIG. 2 is a diagram showing the relationship between the temperature in warm shot peening, number of cycles to failure and surface roughness of the spring steel in the invention.
Figure 3:
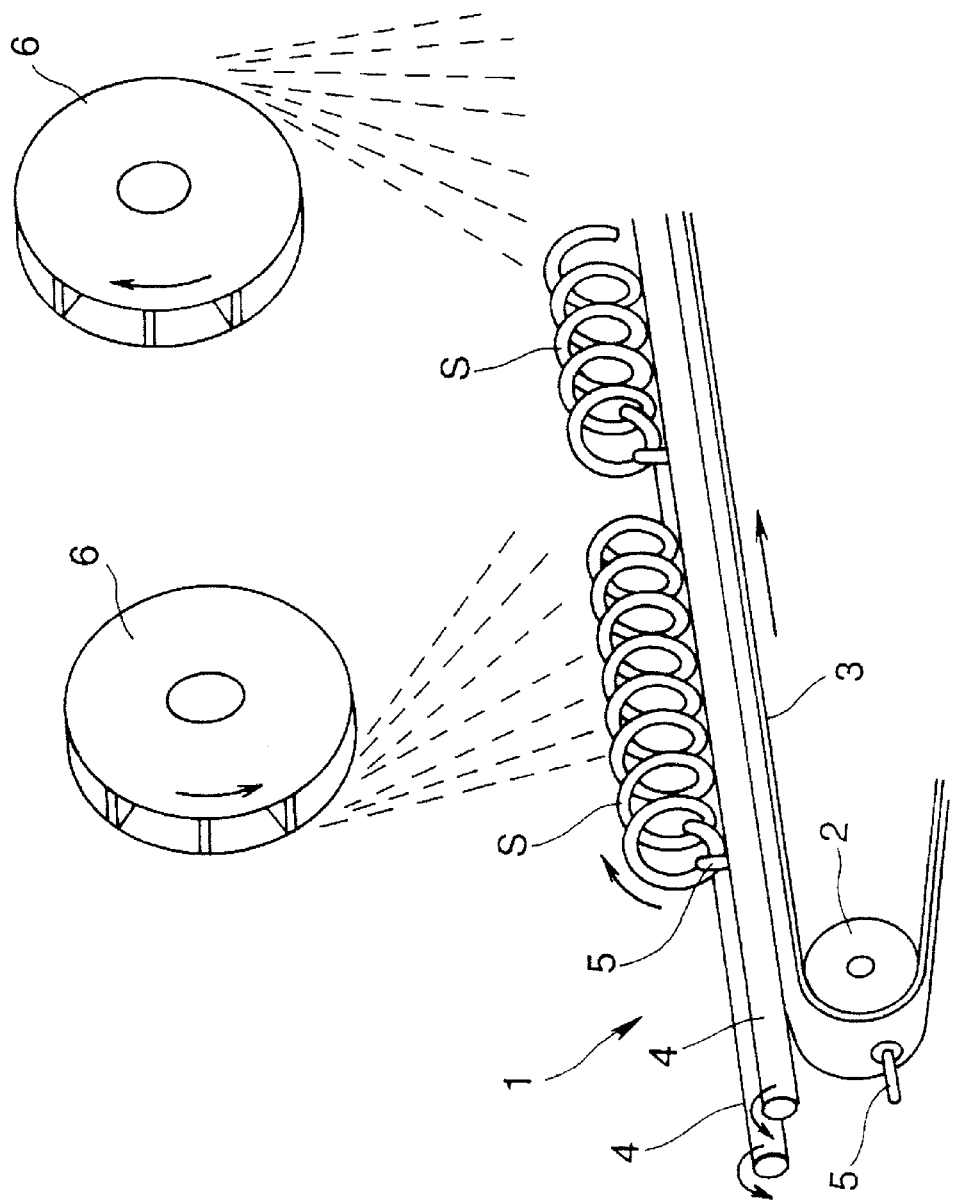
FIG. 3 is a perspective view of a shot peening apparatus in an embodiment of the invention.

FIG. 3 shows an embodiment of a shot peening apparatus for carrying out the invention. Reference numeral 1 in the figure is a conveyer belt, which is approximately constructed by turning a belt 3 around a pulley 2. A pair of parallel guide shafts 4 and 4 is arranged along the upper surface of the belt 3. A plurality of pins 5 are attached on the upper surface of the belt 3, and the pins 5 project upwardly through the intermediate of the guide shafts 4 and 4. The guide shafts 4 and 4 are rotatable in the same direction around the axis thereof, so that coil springs S on the guide shafts 4 and 4 are rotated, and pin 5 engages with the coil spring S to travel it. A pair of ablator wheels 6 and 6 which rotate in mutually opposite directions is arranged above the thus constructed a conveyer belt 1, so as to project shot on the end surface and the side surface of the coil spring S.

The above construction is a shot peening apparatus for performing preliminary warm shot peening, and the apparatus can also be applied to warm stress shot peening. In this case, the coil spring S is passed two times through one shot peening apparatus, thereby performing preliminary warm shot peening and warm stress shot peening. Alternatively, two shot peening apparatuses may be arranged and preliminary warm shot peening and warm stress shot peening are respectively performed in each shot peening apparatus.

The coil spring S can be heated by heating in tempering or annealing, or alternatively, an optional heating furnace can be provided at the upstream of the shot peening apparatus, or can be provided intermediate between the two shot peening apparatus.

Figure 4A:
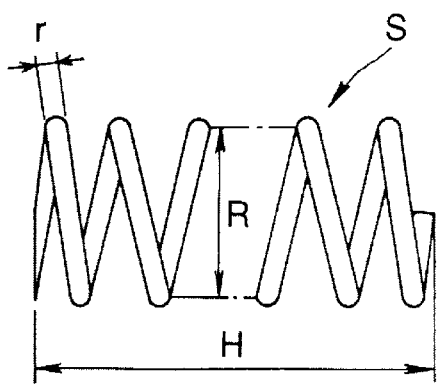
FIG. 4A is a side view of a coil spring in an embodiment of the invention.
Figure 4B:
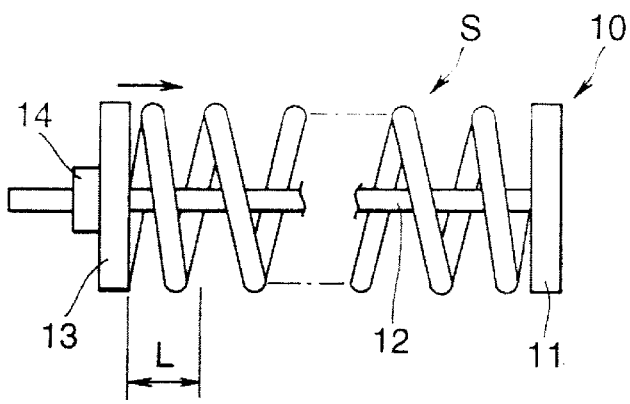
FIG. 4B is a perspective view showing the state in which a coil spring is installed in a jig.

A jig 10 shown in FIG. 4B can be used in warm stress shot peening. In FIG. 4B, reference numeral 11 is a disk, of which the center portion is attached to a shaft 12. A disk 13 is slidably fitted to the end of the shaft 12 in the axial direction thereof. The disk 13 is clamped to the right in the figure by a nut 14 screwed at the end of the shaft 12. Hence, the coil spring S, which was in a free state shown in FIG. 4A, is compressed in the distance L, whereby predetermined stress is imparted thereto. The coil spring S installed to the jig 10 is passed through a shot peening apparatus as shown in FIG. 3, and warm stress shot peening is performed.

EXAMPLE

Example 1 of Invention
Warm Stress Shot Peening

Coil springs with specifications shown in Table 1 were produced from a wire made from a material specified by the Japanese Industrial Standard No. SUP7 with a diameter of 12.5 mm, and they were subjected to thermal refining through quenching and tempering to have hardnesses in the range of 2.5 to 2.65 HBD. The coil springs were maintained in a heating furnace at 315° C. for 20 minutes, and they were then subjected to preliminary warm shot peening, in which shot was projected on the end surface of the coil spring, by passing the coil spring through the shot peening apparatus shown in FIG. 3. The chemical composition of the coil spring was 0.59% C, 0.85% Mn, 2.05% Si, 0.15% Cr, and the balance Fe by weight %.

TABLE 1

| Wire Diameter r (mm) | Average Coil Diameter R (mm) | Effective Winding Number | Spring Constant (kgf/mm) | Free Length (mm) |
|---|---|---|---|---|
| 12.5 | 110 | 5.39 | 3.40 | 382 |

Then, the coil spring was installed in the jig shown in FIG. 4B and was compressed to be imparted with stress of 75 kgf/mm$^2$. The coil spring was then pre-heated at 315° C. similarly as the above, and was subjected to warm stress shot peening by passing it through the shot peening apparatus. A cut wire with a diameter of 0.87 mm was used as shot in the preliminary warm shot peening and the warm stress shot peening.

EXAMPLE 2
Warm Stress Double Shot Peening

A coil spring the same as in Example 1 of the invention, was subjected to preliminary warm shot peening under the same conditions as Example 1. The coil spring was subjected to a first warm stress shot peening, and was then subjected to a second warm stress shot peening under the same conditions as the first warm stress shot peening except for using a cut wire with a diameter of 0.67 mm as shot.

Comparative Example 1
Cold Double Shot Peening

In Comparative Example 1, shot peening in room temperature was performed two times instead of the preliminary warm shot peening and the warm stress shot peening in the invention. In the second shot peening, a cut wire with a diameter of 0.67 mm was used as the shot. A coil spring of Comparative Example 1 was produced under the same conditions as the examples of the invention except for the above conditions.

Comparative Example 2
Warm Double Shot Peening

Warm shot peening under the same conditions as the examples of the invention, except for no stress, was performed two times. In the second shot peening, a cut wire with a diameter of 0.67 mm was used as shot. A coil spring of Comparative Example 2 was produced under the same conditions as the examples of the invention except for the above conditions.

Comparative Example 3
Cold Stress Shot Peening

Preliminary warm shot peening and stress shot peening under the same conditions as the examples of the invention except that they are conducted at room temperature was performed. A coil spring of Comparative Example 3 was produced under the same conditions as the examples of the invention except for the above conditions.

Durability Test

The coil springs in Examples 1 and 2 of the invention and Comparative Examples 1 to 3 were subjected to setting in which a stress of 134.1 kgf/mm$^2$ was applied thereto, and they were subjected to a durability test after being subjected to painting and drying at 150° C. serving as low temperature annealing. In the durability test, the coil spring was installed in a durability test machine applying stress of 75 kgf/mm$^2$ thereto, and an alternating stress of ±45 kgf/mm$^2$ was applied to the coil spring at a frequency of 5.0 Hz, whereby the number of cycles to failure was recorded. The results of the test were shown in Table 2. The coil spring in Example 2 of the invention was further subjected to a durability test under the same conditions as the above except that the alternating stress was ±55 kgf/mm$^2$. The results of the tests are also shown in Table 2.

TABLE 2

| | No. | Number of Cycles to Failure | Note |
|---|---|---|---|
| Example 1 of the Invention | 1 | 938,600 | Stopped at a million cycles with no breakage |
| | 2 | 1,000,000 | |
| | 3 | 1,000,000 | |
| | 4 | 704,200 | |
| Example 2 of the Invention | 1 to 4 | 1,000,000 | Stopped at a million cycles with no breakage |
| | 5 | 255,300 | |
| | 6 | 314,200 | |
| | 7 | 456,100 | |
| | 8 | 605,400 | |
| Comparative Example 1 | 1 | 96,200 | Cold double shot peening |
| | 2 | 118,500 | |
| | 3 | 85,300 | |
| | 4 | 104,600 | |
| Comparative Example 2 | 1 | 287,400 | Warm double shot peening |
| | 2 | 261,300 | |
| | 3 | 371,500 | |
| | 4 | 201,500 | |
| Comparative Example 3 | 1 | 302,800 | Cold stress shot peening |
| | 2 | 383,800 | |
| | 3 | 344,400 | |
| | 4 | 347,600 | |

As is clear from Table 2, the numbers of cycles to failure in Example 1 of the invention were approximately one million cycles, and the samples demonstrated superior durability. In Example 2 of the invention in which warm stress double shot peening was performed, all the samples (Nos. 1 to 4) were not broken at a million cycles in the case when the alternative stress of ±45 kgf/mm$^2$ was applied in the installation state at 75 kgf/mm$^2$, and good durability was demonstrated even in the case when the alternative stress of ±55 kgf/mm$^2$ was applied (Nos. 5 to 8). In contrast, in Comparative Example 2 in which cold double shot peening was performed, the numbers of cycles were about 100,000, and this showed that the samples are not able for practical use. In Comparative Example 2 in which warm double shot peening was performed, the durability was relatively improved and the numbers of cycles were approximately 300,000. In Comparative Example 3 in which cold stress shot peening was performed, although the durability was further improved, the numbers of cycles were only 350,000. Thus, the invention in which warm stress shot peening was performed demonstrated that the durability was greatly improved.

Figure 5:
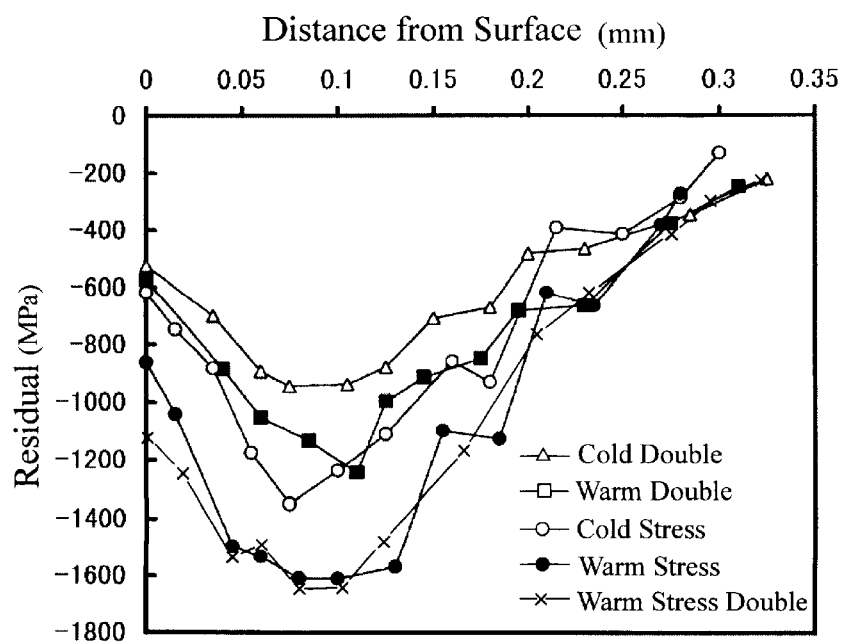
FIG. 5 is a diagram showing the distribution of the residual stress obtained by the each condition of shot peening in a first example.

FIG. 5 shows a distribution of residual stress imparted by each shot peening condition. Residual stress severely affects the fatigue strength, and it has been demonstrated that larger residual strength and deeper distribution thereof are more suitable for improvement of the fatigue strength. Observing the residual stress distribution in each condition of the shot peening shown in FIG. 5 from this point of view, the residual stress in the cold double shot peening, in which the fatigue strength was smallest, had the smallest distribution, and the peak value thereof is −900 MPa. The residual stresses in the warm shot peening and the cold stress shot peening, in which the fatigue strengths are almost the same, had almost the same distribution, and the peak values thereof are about −1300 MPa. In contrast, the residual stresses in the warm stress shot peening and the warm stress double shot peening, in which the fatigue strengths are very high, had greatly large distributions in comparison with the others, and the peak values thereof are −1600 MPa or more.

Although the above examples are exemplifications of a coil spring of the invention, the invention is not limited to the spring. The invention can be applied to any spring, such as leaf springs, disk springs, torsion bars, tension rods, and stabilizers.

As explained as above, according to the invention, warm stress shot peening is performed on a spring steel while applying stress to the springs, durability is therefore greatly improved in a high service stress.

What is claimed is:

1. A production process for highly strengthened springs, the process comprising:

performing a first shot peening on a spring steel having a hardness of 550 HV or more, corresponding to a diameter of 2.7 mm or less on a Brinell ball mark, while applying stress to the springs at a warm temperature in a range of 150 to 350° C.

2. A production process for highly strengthened springs according to claim 1, wherein a second shot peening is performed on the spring steel using shot with a diameter smaller than that of the first shot peening while applying stress to the spring at a warm temperature in the range of 150 to 350° C.

3. A production process for highly strengthened springs according to claim 1, wherein the stress is applied by a jig which contacts a portion of the spring, at least the portion of the springs is subjected to preliminary warm shot peening at a temperature in the range of 150 to 350° C. before the first shot peening at a warm temperature in the range of 150 to 350° C.

4. A production process for highly strengthened springs according to claim 1, wherein the stress is 75 kgf/mm$^2$ or more.

5. A highly strengthened spring obtained by performing a first shot peening on a spring steel having a hardness of 550 HV or more, corresponding to a diameter of 2.7 mm or less on a Brinell ball mark, while applying stress to the spring at a warm temperature in the range of 150 to 350° C.

6. A highly strengthened spring according to claim 5, wherein a second shot peening is performed on the spring steel using shot with a smaller diameter than that in the first shot peening while applying stress to the springs at a warm temperature in the range of 150 to 350° C.

7. A highly strengthened spring according to claim 5, wherein the stress is applied by a jig which contacts a portion of the spring, at least the portion of the spring is subjected to preliminary warm shot peening at a temperature in the range of 150 to 350° C. before the shot peening at a warm temperature in the range of 150 to 350° C.

8. A highly strengthened spring according to claim 5, wherein the stress is 75 kgf/mm$^2$ or more.

* * * * *